United States Patent [19]

Majicek et al.

[11] 4,324,372
[45] Apr. 13, 1982

[54] HIGH DENSITY BELT DRIVEN DIGITAL DATA TAPE CARTRIDGE

[75] Inventors: Stepan Majicek, San Jose; Harry R. Robinson, Santa Clara, both of Calif.

[73] Assignee: Verbatim Corporation, Sunnyvale, Calif.

[21] Appl. No.: 150,571

[22] Filed: May 16, 1980

[51] Int. Cl.³ .................. G03B 1/04; G11B 15/32
[52] U.S. Cl. ............................... 242/192; 226/59
[58] Field of Search ............. 242/192, 197, 199, 200, 242/201, 76; 360/96, 132; 226/59, 60, 61

[56] References Cited

U.S. PATENT DOCUMENTS

| | | | |
|---|---|---|---|
| 2,676,766 | 4/1954 | Ross et al. | 242/76 |
| 3,976,262 | 8/1976 | Kennedy | 242/192 |
| 4,102,516 | 7/1978 | Anglin et al. | 242/199 |
| 4,209,144 | 6/1980 | Majicek et al. | 242/192 |

Primary Examiner—Leonard D. Christian
Attorney, Agent, or Firm—Thomas E. Schatzel

[57] ABSTRACT

An improved belt driven tape cartridge including inertial flywheels in intimate contact with the recording tape along the tapes path to reduce high frequency tape flutter, and improved tape-guide members incorporating conically shaped guiding flanges, the guides being positioned adjacent the flywheels to alleviate tape edge damage.

11 Claims, 4 Drawing Figures

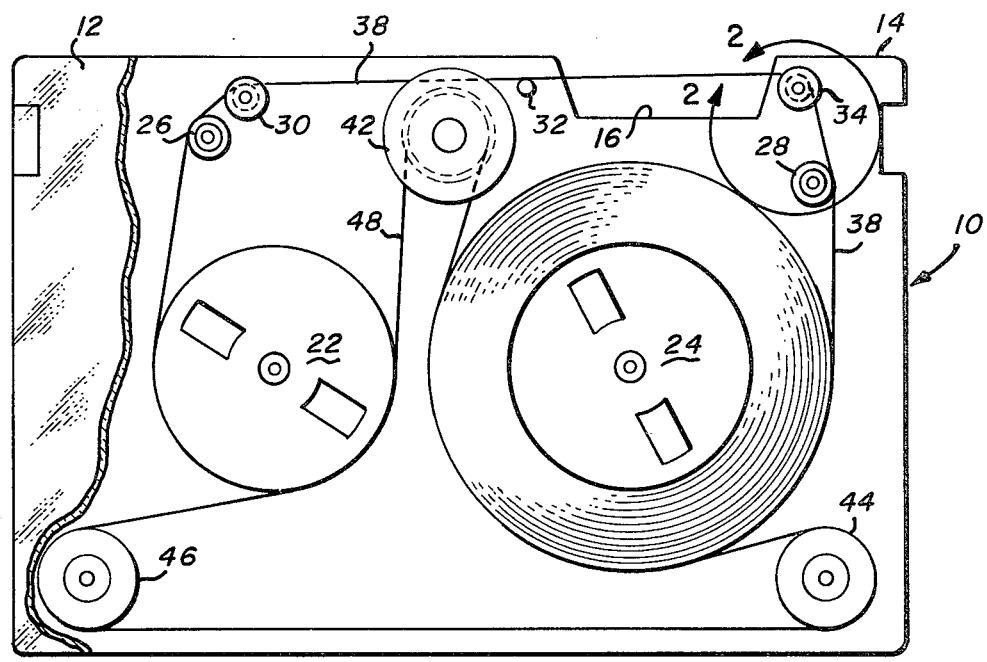
*Fig_1*
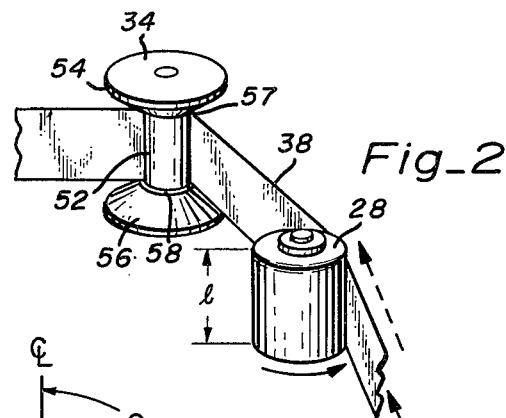
*Fig_2*
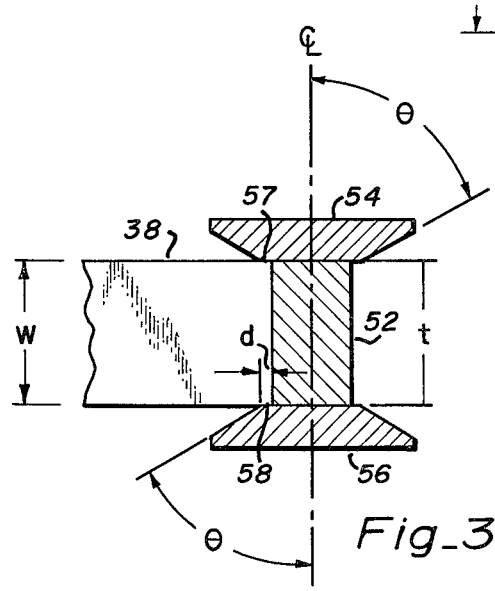
*Fig_3*
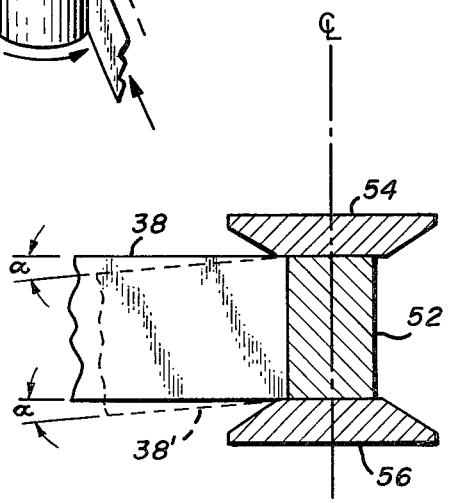
*Fig_4*

HIGH DENSITY BELT DRIVEN DIGITAL DATA TAPE CARTRIDGE

BACKGROUND OF THE INVENTION

1. Field of the Invention

The present invention relates generally to belt driven magnetic tape cartridges and more particularly to belt driven magnetic tape cartridges especially adapted for high density digital data recording on thin magnetic tapes.

2. Description of the Prior Art

Belt driven magnetic tape cartridges are widely used in the computer industry for digital data recording. One particular form of such cartridge is taught by the United States Pat. No. 3,692,255, issued to Robert A. Von Behren. The Von Behren tape cartridge has two reel hubs onto which magnetic recording tape is wound. The hubs are driven by a flexible driving belt which extends around two guide rollers and a driving roller such that the belt contacts the magnetic tape pack formed about the reel hubs. Rotation of the driving roller drives the belt and thereby causes the tape to move between the two reel hubs. This places the tape traveling between the two reel hubs under tension. This cartridge construction permits low power bidirectional drive and rapid acceleration and deceleration of the tape by a single reversible driving means.

For several years, manufacturers of tape recording and reproducing mechanisms have been attempting to manufacture and sell mechanisms capable of recording and reproducing digital data on this style of belt driven magnetic tape cartridge at capacities in the order of 6,400 linear bits per inch. These attempts have not been commercially successful. A key reason for the lack of success is due to the fact that the currently available tape cartridges develop too much flutter after having been placed in service for short periods of time. In connection with belt driven tape cartridges, "flutter" means high frequency variations in the linear velocity at which the tape moves past the recording and/or reproducing means. One manufacturer of such a digital recording and reproducing mechanism requires that the flutter, i.e. variations in the linear velocity of the tape, be less than 0.8% of the average linear velocity. Though some currently commercially available belt driven tape cartridges will meet this specification when initially placed in service, they do not hold such tolerances after the cartridge is in use for a short time period. For example, after approximately forty repetitive movements of a short section of the tape in such a cartridge along the same section of that tape, the flutter will rise to approximately 5% or greater.

The cause of this flutter is inherent in the structure of these belt driven tape cartridges as taught by Von Behren. The belt drive is designed such that the segment of the tape traveling between the tape segments wound onto the reel hubs is continually under tension. The tension in the tape occurs because the belt driving roller and the two belt guiding rollers are especially adapted to tension the tape so as to cause the take-up reel hub to wind the tape at a faster rate than the rate at which the tape leaves the supply reel hub. Two effects created by this design are first, the tension in the tape increases as tape is moved from a full supply reel hub to an empty take-up reel hub, and second, the tape wound onto a reel hub is under tension. It is believed that a source of high amplitude, high frequency flutter in these belt driven tape cartridges arises from the tensioning of the tape as it is wound onto the take-up reel hub. The mechanism by which it is believed tension in the tape wound onto the reel hub creates flutter in the tape velocity as it moves past the recording and/or reproducing means is as follows. As tape is unwound from a reel hub, the tape located more centrally in that same reel hub progressively becomes exposed. As the tape, wound under tension, becomes exposed, it then becomes possible for it to relax and relieve the tension which has been stored in it. Because of the nature of the magnetic tape itself, and the frictional contact existing between successive layers of tape wound onto the tape reel hub, this relaxation process does not always occur smoothly but can occur in bursts as the tape is wound off the reel hub. During such a burst of relaxation, the tape which is undergoing relaxation will become somewhat shorter and somewhat thicker thereby increasing the tension in the off reel tape and momentarily slowing down its motion across the recording and/or reproducing means. Thus, such high frequency flutter is inherent in these cartridges because of the frictional properties of the magnetic tape used in them and the tape tensioning forces created by the flexible belt driving means. Thus, without some improvement either in the frictional properties of the magnetic tape or the structure of the belt driven tape cartridge, it is difficult, if not impossible, to record and/or reproduce digital data at high linear densities for repeated usage.

A further difficulty with currently manufactured tape cartridges is that they tend to damage the edges of the tape as the tape is wound from one tape reel hub to the other tape reel hub. Due to manufacturing tolerances and misalignments in the tape path, the tape approaching tape guides in the tape path does so at an angle from the theoretical perfect alignment. It is common for the misalignment to be in the order of one degree or greater. With tape cartridges heretofore available this has resulted in damage to the tape edge by the guides urging the tape back into alignment. The damage becomes significantly pronounced when the cartridge is loaded with thin magnetic tape, e.g. tape of a 0.5 mil thickness base. The damage to the edges of thin based tape is so severe that complete stoppage of tape movement within the cartridge frequently occurs after approximately 100 to 300 end-to-end transport cycles of tape having a 0.5 mil base. The misalignment is also projected in deflection of the tape from a parallel position to the recording/reproducing bead causing reduced recording output on the edge tracks because of poor head-to-tape contact.

Fixed tape guide members are known in the art of magnetic tape recording and reproducing apparatus, for example, see U. S. Pat. No. 3,270,936, issued to Selsted, et al. However, the tape-guider members of the Selsted patent were especially adapted for use in recorders with removable reels of magnetic recording tape, and the tape guide has conically shaped end pieces in order to facilitate easy threading of magnetic recording tape through the apparatus and for guiding the travel of the magnetic recording tape through the apparatus and for guiding the travel of the magnetic recording tape back onto the right cylindrical body if the magnetic recording tape becomes improperly positioned on the tape guide member. In belt driven tape cartridges, because the magnetic recording tape is contained in a protective enclosure, because the cylindrical guiding flanges placed at the terminal ends of the cylindrical body are essentialy normal to the cylindrical body at the terminal ends, and because of the constant tension in the magnetic recording tape produced driving belt, it is impossible for the magnetic recording tape in a properly manufactured and assembled cartridge to become so improperly positioned on the tape-guide members that the conical surface of the Selsted guide member would ever function as a guide to restore the travel of the magnetic recording tape back onto the right cylindrical body portion of the tape-guide member.

SUMMARY OF THE PRESENT INVENTION

An object of the present invention is to provide an improved belt driven tape cartridge having substantially reduced high frequency flutter.

Another object of the present invention is to provide an improved, belt driven tape cartridge capable of repetitive reliable operation when loaded with thin magnetic recording tape.

A further object is to provide an improved belt driven tape cartridge with reduced high frequency flutter, which cartridge is economical.

A further object is to provide an improved, low cost belt driven tape cartridge capable of repetitive reliable operation when loaded with thin magnetic tape on the order of 0.5 mil. thickness.

Briefly, a preferred embodiment of this invention relates to the use of cylindrical longitudinal flywheels in constant contact with the magnetic tape and located in the reel tape path on both sides of the recording and/or reproducing means. The flywheels are positioned and adapted to absorb longitudinal vibrations and thereby isolate the record/reproduce transducer region from the vibrations. In addition, the preferred embodiment includes an improved tape guide member which is configured to mitigate damage to the edges of the magnetic tape as the tape tends to laterally creep off of the desired tape path. The tape guide members are positioned with one each adjacent to a flywheel. The members are configured with a longitudinal right cylindrical section and a frusto-conical shaped flange on opposite ends thereof. The tapered flanges, when in contact with the tape alleviate edge damage and allow the tape to pass over the guide without crumbling the tape edge.

The advantage obtained by employing the flywheel is the reduction of flutter and the resultant creation of an improved belt driven tape cartridge capable of reliably recording and reproducing digital information at higher recorded densities, e.g., 6,400 linear bits per inch.

A further advantage is that repeated passes of the tape may be made with reduced damage occurring to the tape edges.

A further advantage is that an improved belt driven cartridge is realized which economically can be manufactured at approximately the same cost as prior art structures.

These and other objects and advantages of the present invention will no doubt become obvious to those of ordinary skill in the art after having read the following detailed description of the preferred embodiments as illustrated in the various drawing figures.

IN THE DRAWINGS

FIG. 1 is a plan view of the tape cartridge of the present invention with part of the enclosure broken away;

FIG. 2 is a perspective view of the section of the cartridge of FIG. 1 along the line 2—2 illustrating the flywheel and the improved tape guide member;

FIG. 3 is a cross-sectional view of the improved tape-guide member of FIGS. 1 and 2 with the tape entering under ideal alignment conditions; and FIG. 4 is a cross-sectional view of an improved tape-guide member of FIG. 3 with the tape entering at an acute angle as commonly encountered in practice.

DETAILED DESCRIPTION OF THE PREFERRED EMBODIMENT

FIG. 1 shows a tape cartridge assembly, referred to by the general reference number 10, and incorporating the teachings of the present invention. The cartridge 10 has an enclosure created by a plastic shell 12 and a planar base plate 14. Projecting edges of the shell 12 are in intimate contact with the base plate 14 to form the rectangular enclosure. The shell 12 has a cutaway portion 16 through which the tape recording and/or reproducing means, not shown, can enter the volume enclosed by the shell 12 in contact with the base plate 14 and interface with the recording media.

Rotatably mounted on parallel axes essentially perpendicular to the base plate 14 and within the volume enclosed by the shell 12 and base plate 14 are a first reel hub 22 and a second reel hub 24. Also rotatably mounted on essentially parallel axes essentially normal to the base plate 14, and within the volume enclosed by the shell 12 and base plate 14, are a cylindrical longitudinal flywheel 26 and a cylindrical longitudinal flywheel 28. Also rigidly mounted to the base plate 14, with their axis of circular symmetry essentially perpendicular to the base plate 14 and within the volume enclosed by the shell 12 and the base plate 14, are an improved stationary tape guide member 30, a tape guide pin 32 and an improved stationary tape guide member 34. A length of magnetic recording tape 38 is partially, convolutely wound on the first reel hub 22. The tape 38 extends along a tape guide path formed by the first flywheel 26, the first improved tape guide member 30, the tape guide pin 32, the second improved tape guide member 34, the second flywheel 28, and the second reel hub 24. The remaining portion of the length of magnetic recording tape 38 is convolutely wound onto the second reel hub 24 in a direction opposite to that in which it is wound onto the first reel hub 22.

Also rotatively mounted on essentially parallel axes essentially normal to the base plate 14 and contained within the enclosure created by the base plate 14 and the shell 12 are a belt driving roller 42, a first belt guide member 44, and a second belt guide member 46. A driving belt 48 extends along the belt guide path formed by the belt driving roller 42, the surface of the magnetic recording tape wound onto the second reel hub 24, the first belt guide member 44, the second belt guide member 46 and the magnetic recording tape 38 wound onto the first reel hub 22. The belt 48 is a thin, continuous, flexible and elastic material. When the cartridge 10 is inserted into a cartridge drive mechanism (not shown), a capstan drives the driving roller 42 which in turn drives the belt 48, which in turn drives the tape packs on the hubs 22 and 24.

The means by which the foregoing elements cooperate to move the magnetic recording tape 38 bidirectionally from one reel hub to the other is similar to that described in U.S. Pat. No. 3,692,255, issued to Von Behren.

The first flywheel 26 and the second flywheel 28 are identical in shape. Both are right circular cylinders whose length along their cylindrical axes is slightly greater than the width of the tape 38 (See FIG. 2). In a preferred embodiment especially adapted for a belt driven tape cartridge, having a tape of one-quarter inch width the longitudinal length "1" of the flywheels 26 and 28 are approximately 0.300–0.350 inches in height. The diameter of the flywheels 26 and 28 are further selected such that they are of sufficient size to have an angle of wrap with the tape to absorb longitudinal tape vibrations but of not such size as to create an impeding mass in the tape path adversely effecting the acceleration-deceleration characteristics of the tape when in operation. In the preferred embodiment for a quarter-inch tape, the diameter of the flywheels is approximately 0.312 inches. The axis of rotation of the flywheels 26 and 28 are located on the base plate 14 so that the outer cylindrical surface of the flywheels intimately contacts the tape 38 across its full width with the tape wrapping around an arcuate segment of each of the flywheels at all times regardless of the size of the adjacent tape pack. The degree of wrap is selected such that movement of the tape 38 causes the flywheel to rotate with the tape and there is no or very little slippage.

In operation, when the magnetic recording tape 38 is being moved, for instance, from the reel hub 24 to the first reel hub 22, a longitudinal vibration (illustrated by the broken-line arrow in FIG. 2) is instilled in the tape. The vibration results from the fact that the tape 38, when convolutely wound under tension onto the reel hub 24, was wound under tension. However, when being unwound, as the tape 38 exits from the pack formed on the hub 24 relaxes and a longitudinal vibration is sent along that section of magnetic recording tape 38. This longitudinal vibration, unless curtailed, tends to cause disturbances about the head-to-tape interface. In the embodiment 10, as the longitudinal vibration, created by the tape relaxation, travels along the tape 38 it reaches the flywheel 28 (see FIG. 2). The vibration attempts to rotate the flywheel due to the intimate frictional contact between the magnetic recording tape 38 and the flywheel 28. Because the inertia of the flywheel 28 is large in comparison with the energy in the longitudinal vibration, the rotary acceleration which it causes in the flywheel 28 is small. Hence most, if not all, of the longitudinal vibration is dampened and little, if any, longitudinal vibration continue in the magnetic recording tape 38 past the flywheel 28. In the absence of the flywheel 28, the full amplitude of this longitudinal vibration would continue along the magnetic recording tape 38 around the tape guide member 34 and past the recording and/or reproduction transducer means inserted through the cutaway portion 16 of the shell 12. This longitudinal vibration would then appear as a high frequency high amplitude flutter in the velocity of the magnetic recording tape 38 as it moves past the recording means. The same reaction occurs when the tape 38 is driven in the opposite direction and as it exits from the tape pack of the reel hub 22. With the tape cartridge assembly 10, the flywheel 26 dampens the resultant longitudinal vibrations.

It has been found in experiments that in the absence of the flywheels 26 and 28, on the average, a standard belt driven one-quarter inch tape cartridge will exhibit flutter greater than 5% after a particular section of the magnetic recording tape 38 has been shuttled back and forth forty times. In the improved belt driven cartridge 10 with the flywheels 26 and 28 the flutter has been found to be less than 0.8% under the same test conditions.

The detailed structure of both stationary tape-guide members 30 and 34 is shown in detail in FIGS. 2–4. The tape-guide members 30 and 34 are identical and consist of a right cylindrical body 52. The upper terminal end of the body 52 is in contact with an upper guiding flange 54 and a lower terminal end of the body 52 is in contact with a lower guiding flange 56. The flanges 54 and 56 are of identical shape in the form of a frustrum of a cone with the conical axis coaxial with axis of the cylindrical body. The right cylindrical body 52 has a length "t" along its cylindrical axis which is only slightly greater than the width "w" of the magnetic recording tape 38. In the preferred embodiment especially adapted for use in belt driven tape cartridges for one-quarter inch tape, the circular diameter of the right cylindrical body 52 is approximately 0.208 inches.

The smallest radius of the frustrum of each of the flanges 54 and 56 is greater than the radius of the right cylindrical body 52 by a distance "d". In the preferred embodiment, especially adapted for belt driven tape cartridges for onequarter inch tape, the distance "d" is approximately six times the thickness of the tape 38 to be guided. The arrangement of the right cylindrical body 52 with the upper guiding flange 54 and the lower guiding flange 56 creates essentially parallel annular lands 57 and 58 at the point of intersection of the right cylinder 52 with the flanges 54 and 56, respectively. The lands 57 and 58 are separated by the distance "t". The conical shaped guiding flanges 54 and 56 produces a tapered surface for the tape and urging it intermediate the lands. The guide members 30 and 34 have no sharp corners to contact the width of the magnetic recording tape 38 as do conventional tape-guide members which have guiding flanges in the shape of right cylinders. The tapered surfaces face the tape 38 so that the tape, if misaligned, is gently introduced to the tape guide, and as it exits the guide, is not deflected. With the current state of the art for the manufacturer of belt driven tape cartridges 10, tape misalignments in the order of one degree from the axis of the right cylindrical body 52 is common. Thus, as illustrated in FIG. 3, the angle theta between the conic axis and the surface of the cone must preferably be less than 89° and is, in the preferred embodiment, approximately 85°.

To further illustrate the operation of the tape guide members 30 and 34, FIG. 4 shows how the conical surfaces of the guiding flanges 54 and 56 avoid damaging the edges of the tape 38 when the tape 38 is entering the tape-guide member misaligned at an acute angle alpha. The tape edge merely contacts the tapered surface and it moves in flat surface contact over the guide. In prior art guides, the edge of the tape is damaged as it is forced in between the center cylinder and the outer cylindrical flange. As a result of this damage, the life of the tape and thus the cartridge is limited due to this damage. The improved guide members help overcome the tape edge damage and thus prolong the life of the tape and thus the tape cartridge. The guides 30 and 34 are located intermediate the flywheels 26 and 28 and the cutout 16 so as to provide the alignment within the record/reproduce area. Improved belt driven tape cartridge assemblies 10 incorporating the improved tape-guide members 30 and 34 and into which was loaded magnetic recording tape 38 having a 0.5 mil base have performed as many as 2,500 end-to-end transport cycles of the magnetic recording tape 38 without showing any significant tape damage and, hence, remained functional.

In the preferred embodiment 10, the flywheels 26 and 28 and tape guides 30 and 34 are positioned such that they contact the non-oxide side of the tape 38. This provides additional assurance of disrupting the oxide surface resulting from surface contact.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An improved belt driven tape cartridge including a shell means defining an enclosure having a cutaway portion along one edge, a pair of reel hubs supported for rotation on spaced parallel axes within said enclosure, a length of tape convolutely wound on said reel hubs in opposite directions about the axes of said reel hubs and guided through a path along one edge of said enclosure and across said cutaway portion, and a driving belt supported within said enclosure by a driving roller and a pair of belt guide members defining a belt guide path spaced from said tape path and passing between said reel hubs from said belt driving roller to each of said belt guide members wherein the improvement comprises, a first and a second flywheel rotatable about a fixed axis, the axes of the flywheels being parallel to the axes of said reel hubs, the first and second flywheel being located on opposite sides of said cutaway portion of said enclosure along said tape guide path, each flywheel situated intermediate one of said reels and said cutaway portion, both of the flywheels being rotatably mounted and positioned so as to intimately contact said tape across the full width of said tape with the tape wrapping around a portion of each of said flywheels at all times, whereby the flywheels absorb longitudinal vibrations in the tape.

2. The improved belt driven tape cartridge of claim 1 wherein
the first and second flywheels are cylindrical bodies of a longitudinal length greater than the width of said tape.

3. The improved belt driven tape cartridge of claims 1 or 2 further including
a first and a second tape guide member, the first and second guide members being located on opposite sides of said cutaway portion of said enclosure along said tape guide path and in intimate contact with said tape with the first tape guide being intermediate said cutaway portion and the first flywheel and the second tape guide being positioned intermediate said cutaway portion and the second flywheel, the first and second guide members each being in the form of a right cylindrical body slightly longer in length along their cylindrical axes than the width of said tape being guided thereon, with guiding flanges located about both terminal ends of the right cylindrical bodies, said guiding flanges being in the shape of a frustrum of a cone, the conic axes of said guiding flanges being essentially collinear with the axis of the cylindrical body and the circular planar face of said guiding flanges being in intimate contact with the terminal ends of said cylindrical body.

4. The improved belt drive tape cartridge of claim 3 wherein
the smallest radius of said frustrums is greater than the radius of the right cylindrical body by an amount of approximately six times the thickness of the tape being guided.

5. The improved belt drive tape cartridge of claim 3 wherein
said frustrum has an included angle between the cylindrical axis and the conic surface of less than eighty-nine degrees.

6. The improved belt drive tape cartridge of claim 5 wherein the smallest radius of said frustrums is greater than the radius of the right cylindrical body by an amount of approximately six times the thickness of the tape being guided.

7. The improved belt driven tape cartridge of claim 3 wherein
the first flywheel is positioned intermediate the first tape guide and adjacent one of said reel hubs with the degree of tape wrap varying depending on the volume of tape on said adjacent reel hub and the degree of wrap on the first tape guide being constant independent of the volume of tape on either reel hub.

8. The improved belt driven tape cartridge of claim 7 wherein
the second flywheel is positioned intermediate the second tape guide and adjacent said other reel hub with the degree of tape wrap varying depending on the volume of tape on said other reel hub and the degree of wrap on the second tape guide being constant independent of the volume of tape on either reel hub.

9. The improved belt driven tape cartridge of claim 8 wherein
the first and second flywheels and the first and second tape guide members contact said tape on the same side of the tape.

10. The improved belt driven tape cartridge of claim 9 wherein
the flywheels and tape guide members contact the non-oxide side of the tape.

11. The improved belt driven tape cartridge of claim 1 or 2, further comprising:
a first right circular flywheel post anchored to said enclosure and about which the first flywheel is frictionally engaged and coaxially rotates and a second right circular flywheel post anchored to said enclosure and about which the second flywheel is frictionally engaged and coaxially rotates.

* * * * *